Feb. 9, 1954          C. A. PFEIFER          2,668,570
TIRE RIVET
Filed March 4, 1950
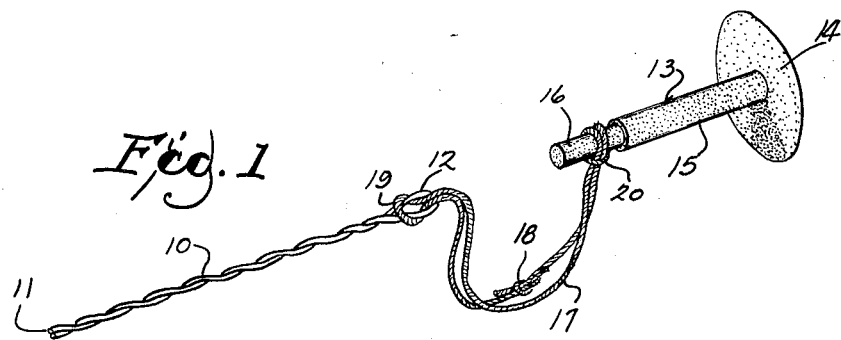
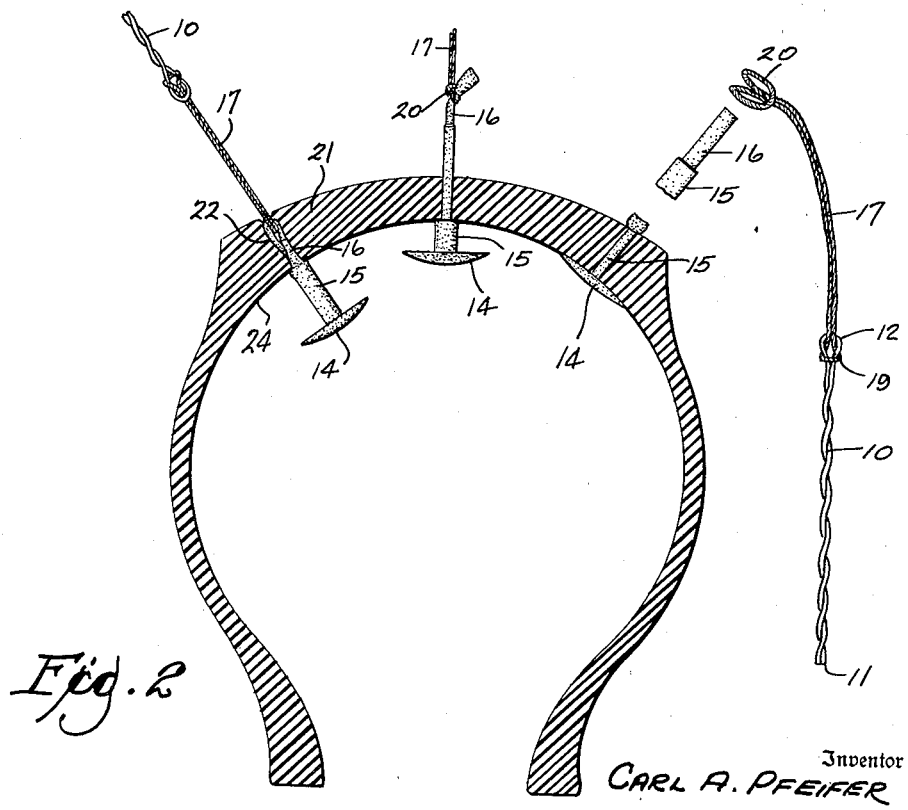
Inventor
CARL A. PFEIFER
Gerald P. Welch
Attorney Patented Feb. 9, 1954

2,668,570

UNITED STATES PATENT OFFICE 2,668,570

TIRE RIVET

Carl A. Pfeifer, Milwaukee, Wis.

Application March 4, 1950, Serial No. 147,699

1 Claim. (Cl. 152—370)

This invention relates to improvements in tire rivets, and more particularly to a novel tire rivet having a cord link, and is an improvement over the rivet disclosed in my Patent No. 2,280,006.

An object of the invention is to provide a device of the type which will have a wire leader linked thereto by a cord which may be used in the application of a plurality of rivets.

Another object of the invention is to provide a device of the type having a wire leader and cord link which will be effectual for insertion of the rivet through a puncture hole in the tire and will at the same time be releasable during the operation for reuse of the leader and cord.

Other and further objects of the invention will appear as the description proceeds, reference being had to the accompanying drawing, in which:

Fig. 1 is a view in perspective of a tire rivet embodying the invention.

Fig. 2 is a sectional view taken transversely through a tire showing three steps in the application of one of the rivets.

Referring more particularly to the drawing, the numeral 10 represents a twisted wire leader having the insertion point 11 and the eye formation 12 at its blunt end. The tire rivet 13 is comprised of a circular base portion 14 and an elongated stem 15 having a reduced portion at 16 thereof. The base portion 14 is thickest in its central part and is graduated toward the edge thereof to relative thinness. The rivet 13 is preferably formed of rubber or other resilient material having sufficient elasticity for the purpose.

A cord link 17 connects the wire leader 10 with the rivet 13 and has a knot at 18 thereof. The cord 17 is looped at 19 through the eye 12 of the wire leader 10, and is double looped at 20 about the reduced portion 16 of the rivet 13. The cord 17 may be formed of any suitable material but it has been found that linen or nylon cord is well adapted for the purpose.

In use, a tire casing 21 which has been punctured as at 22 may be repaired by coating the stem 15 of the rivet 13 and its reduced portion 16 with a quantity of rubber cement, after which the wire leader 10 is introduced by its pointed end from the inside of tire casing 21 through said puncture opening 22. The leader 10 is then grasped exteriorly of the tire casing 21 and pulled forcibly so as to bring the base 14 sharply against the inside 24 of said tire casing surrounding the puncture 22. If this action is taken with the right amount of force, the cord 17 will pull the stem 15 a sufficient distance through the puncture opening 22 and will then release the reduced portion 16 so that the leader 10 and the cord 17 may be used repeatedly with other rivets 13. The stem 15 and its reduced portion 16 will then protrude exteriorly of the tire casing 21 and the stem may then be cut at a desired spaced distance from the casing 21 to make a good repair.

It will be understood that the device is capable of many modifications in structure and design, without departing from the spirit of the invention, within the scope of the appended claim.

Having thus described the invention, what is claimed and desired to be secured by Letters Patent of the United States, is:

In combination, a twisted wire leader having an eye on one end thereof, a resilient tire rivet, a circular base on said rivet, a stem integral therewith, a reduced portion on said stem at the top end thereof and an endless cord looped in said eye and double looped over said reduced portion for pulling said rivet through a puncture aperture after said lead wire.

CARL A. PFEIFER.

References Cited in the file of this patent

UNITED STATES PATENTS

| Number | Name | Date |
|---|---|---|
| 611,414 | Meeker | Sept. 27, 1898 |
| 1,453,485 | Vosburgh | May 1, 1923 |
| 2,280,006 | Pfeifer | Apr. 14, 1942 |